United States Patent

Edwards

[11] 4,341,411
[45] Jul. 27, 1982

[54] HAY BALE MOVER

[76] Inventor: Welby C. Edwards, P.O. Box 1357, Tyler, Tex. 75710

[21] Appl. No.: 180,575

[22] Filed: Aug. 25, 1980

[51] Int. Cl.³ .......................... A01D 87/12; B66C 1/16
[52] U.S. Cl. ...................................... 294/74; 294/120; 414/24.5; 414/911
[58] Field of Search .................... 294/4, 5.5, 61, 67 C, 294/67 E, 74, 75, 78 R, 79, 81 R, 86 R, 120–122, 125, 126; 242/85, 85.1, 86.4, 86.6, 94; 414/24.5, 24.6, 908, 911

[56] References Cited

U.S. PATENT DOCUMENTS

| | | | |
|---|---|---|---|
| 101,122 | 3/1870 | Grimes | 294/120 X |
| 3,148,908 | 9/1964 | Smith | 294/81 R X |
| 3,944,095 | 3/1976 | Brown | 414/24.5 |
| 3,964,621 | 6/1976 | Youngkamp | 414/911 X |
| 4,008,862 | 2/1977 | Wilmes | 414/24.6 X |
| 4,062,461 | 12/1977 | Vincent | 414/24.5 |
| 4,113,116 | 9/1978 | Brandt | 414/24.6 |

Primary Examiner—Johnny D. Cherry
Attorney, Agent, or Firm—LeBlanc, Nolan, Shur & Nies

[57] ABSTRACT

A device for assisting in the movement of large cylindrical hay bales is disclosed. The device consists of an elongated bar constructed of spring steel having a point at one end and apertures at either end. The bar is preferably 72 inches long. Connecting members are adapted to be mounted at the apertures at either end of the bar so that when the bar is thrust axially through a bale, a yoke, chains, or the like may be coupled to either end of the bar at the apertures by the connecting members whereby the bale may be lifted, pulled, or skidded by a tractor. The connecting members may include a clevis and pin or bolt, or preferably, an S-shaped connector.

9 Claims, 3 Drawing Figures

HAY BALE MOVER

This invention relates to a simple and relatively inexpensive means for moving large cylindrical hay bales so that the bales may be moved from place to place without unrolling, and without a special purpose trailer.

In recent years small hay bales which may be easily lifted by hand have been replaced by large cylindrical bales weighing 1–2,000 pounds a piece. Without special equipment, moving such bales from pasture to pasture or the like has presented a problem. In the case of small farmers, the number of bales to be moved may not justify the expense of a special purpose winch and trailer. However, conventional farm machinery, has not, prior to this invention, been adaptable to moving these large bales.

One prior art device used to move such bales includes a two wheel trailer with a winch or hydraulic or electric lift. The bale is winched onto the trailer and then moved.

In U.S. Pat. No. 3,944,095, such a trailer is described. As shown and described therein, a two wheel trailer is provided with an upright support member at the forward end of the trailer. A line passes from a winch disposed forward of the trailer over the upright support, and is connected to the bale. The bale then is rolled onto the trailer as the winch draws in the line. The trailer bed is pivotal about the axle of the wheels so that as the bale rolls over the axle, the trailer will tilt from an inclined position to a horizontal position for transporting the bale.

A somewhat similar two wheel trailer is described in U.S. Pat. No. 3,964,621. In this device, however, the upright support is not provided, and the trailer bed is not pivotal. The bale is winched over the axle and onto the trailer bed with the axle serving as a fulcrum.

U.S. Pat. No. 4,120,405 describes a device, which is tractor mounted, for moving such bales. The device uses elongated probes mounted on a front end loader hydraulic tractor mount. The probes are inserted into a bale and the bale lifted for transportation. A similar probe device could also be mounted on a common three-point tractor hitch so that two bales could be moved simultaneously.

The prior art devices, however, do not describe a simple and efficient means for adapting a conventional tractor, truck, or other type device for moving such bales.

Accordingly, it has been discovered that a pointed steel bar of spring alloy steel may be axially inserted through the bale. By providing a connection means for a yoke or chain, the ends of the bar may be connected to a tractor, jeep, pickup, or the like so that the bale may be skidded from one pasture to another pasture or feedlot location. It has been discovered that the device of this invention will not cause the loss of appreciable hay in transit and will not facilitate the unrolling of the bale.

In addition, the attached line may be adapted to a conventional A-frame lift, hoist, or similar equipment so that the bale may be lifted for loading on a truck.

Accordingly, it is an object of this invention to provide an efficient and inexpensive means for moving large cylindrical hay bales.

It is yet another object to provide a means for attaching large cylindrical hay bales to conventional hauling equipment whereby the bales may be skidded without substantial rotation and loss of hay in transit.

It is yet another object to provide a spring steel bar which may be inserted axially through a cylindrical bale of hay and which has connecting means at either end for connecting the bar to a yoke, chain, or the like which in turn may be connected to a conventional trailer hitch for pulling, or to a conventional A-frame hoist or similar equipment for elevating the hay bale.

These and other objects will become readily apparent with reference to the drawings and following description wherein:

FIG. 3 is a fragmentary view showing an alternate preferred connecting means for connecting the bar and a chain, cable, or the like.

Figure 1:
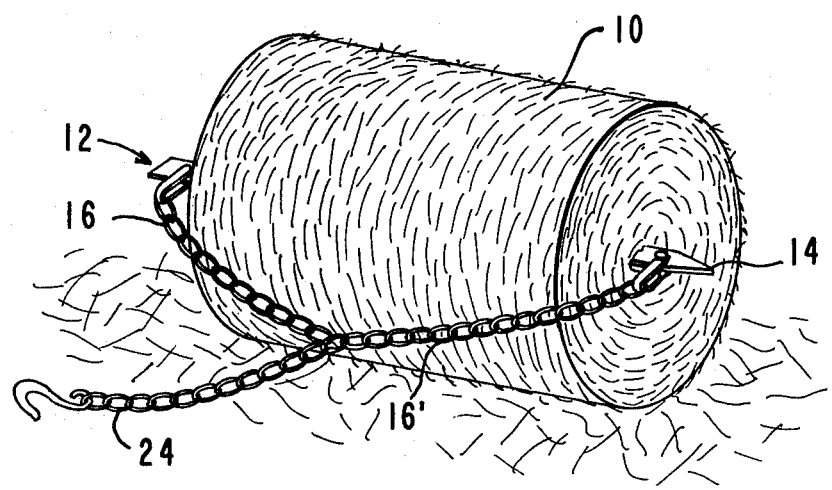
FIG. 1 is a perspective view of the device of this invention mounted in a hay bale for attachment to a conventional tractor or other hauling implement.

With attention to the drawings, and to FIG. 1 in particular, a conventional cylindrical hay bale 10 is formed of rolled layers of hay by conventional apparatus and left in the hay field after the baling process is completed. The diameter of bale 10 may be several feet, and the overall weight may be from 1,000 to 2,000 pounds. The length, however, is standard and less than 72 inches. The bulk and weight of bale 10 then renders the bale difficult to move. In addition, if the bale is rolled, there is a likelihood that the outer layers will unroll causing loss of hay.

The device of this invention comprises a wide, flat spring steel bar 12 of sufficient strength so that it may be thrust axially through bale 10. To facilitate manual insertion of bar 12 through bale 10, an end thereof forms a point 14.

The bar 12 is 72 inches long and preferably 1 and ¾ inches wide by ⅜ inches thick. The width may vary from 1 and ½ to 2 and ½ inches, and the thickness may also vary from lighter or heavier gauges of spring steel. However, it has been discovered that spring steel having a Brinell hardness test rating of 290 to 310 will give sufficient flexibility and durbility so that it will not bend or distort during use.

Figure 2:
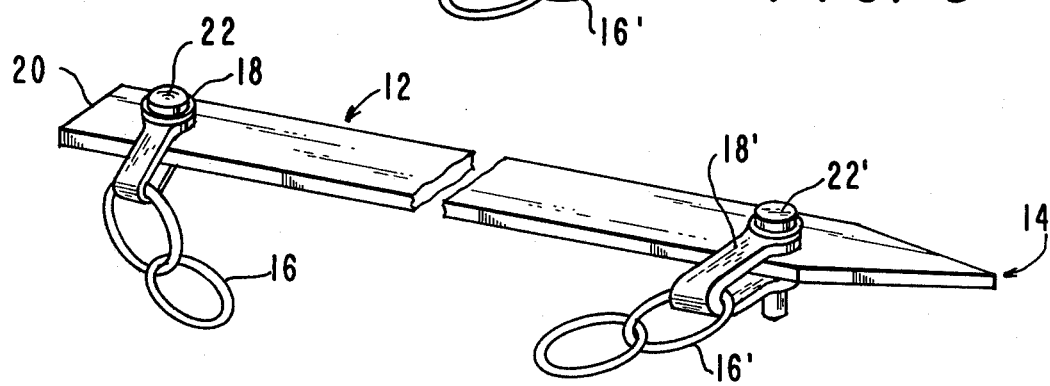
FIG. 2 is a perspective view of the device of this invention with the center section removed.

With attention to FIG. 2, means are provided at either end of bar 12 for coupling the bar to preferably a chain 16 and 16'. In the embodiment of FIG. 2 a clevis or shackle 18 is affixed at the end 20 of bar 12 opposite the pointed end 14. The clevis 18 is affixed to the bar by a pin or bolt 22 which extends through a hole (not shown) in the bar 12. The clevis 18 may be mounted by pin 22 which in turn may be affixed in the conventional fashion with a cotter pin. In the alternative, pin 22 may be a bolt or other conventional fastener.

The end adjacent the point 14 mounts a similar clevis 18'. Clevis 18' is affixed to bar 12 by a pin 22' which is removable so that clevis 18' may be mounted on bar 12 after the bar has been inserted through the bale as shown in FIG. 1.

Figure 3:
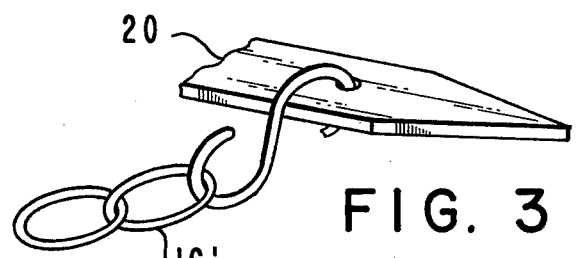

In an alternative embodiment as shown in FIG. 3, an S-link may be substituted for each of clevises 18 and 18' and pins 22 and 22', or substituted for clevis 18' and pin 22', only.

Chains 16 and 16' join to form a V as shown in FIG. 1 and a third chain 24 extends from the apex thereof to a conventional hook or hitch (not shown) which may be mounted on a tractor, jeep, pick-up, or the like (not shown), or which may be mounted on a conventional A-frame lift, hoist, or other similar equipment (also not shown).

If chain 24 is affixed to the conventional hitch on, for example a tractor, and a horizontal force exerted, as will be obvious to those skilled in the art, bale 10 will be caused to skid along the ground as shown in FIG. 1. The faces of bar 12 will lie in planes parallel to the ground and will thereby foreclose rotation of the bale as it is pulled along the ground. If bar 12 was, in the alternative, a spindle or a shaft, rotation would be permitted whereby transfering the bale from place to place would cause substantial loss of hay.

As will be obvious to those skilled in the art, the instant invention provides a simple and inexpensive means for handling a large cylindrical hay bale whereby conventional farm equipment may be utilized without the necessity of purchasing special purpose equipment. It is essential to the instant invention that the device be of sufficient strength and flexibility to be easily inserted into a hay bale and that the device be flat bar stock so that rotation of the bale while being pulled will be minimized. After the bale has been skidded from, for example the hay field to a feed lot, the S-link or clevis adjacent the point may be quickly removed and the bar 12 withdrawn from the hay bale for reuse with another bale. The device then may also be stored when not in use. In contrast, conventional bale moving equipment must either be taken to the field whenever a bale of hay is to be moved or left in the field for extended periods of time.

In summary, the device of this invention comprises a flat bar of spring steel preferably ⅜ inches thick by 1 and ¾ inches wide and 72 inches long. Holes are provided at either end and one end is pointed to facilitate insertion through a hay bale. The device of this invention further includes a pair of couplers for attachment at the holes in either end of the bar and chains mounted thereby for connecting the opposite ends of the bar to a hitch on moving equipment or the like. Preferably the couplers are S-links or clevises or shackles. In addition, it is preferred that the device further include chains extending from each coupler to a common apex and joined to a single chain which in turn is attached by conventional means to the hitch.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A device for coupling a cylindrical hay bale to a hitch on a vehicle for moving said bale in a horizontal direction by skidding along the ground without substantial rotation thereof comprising:
    a flat spring steel bar forming a point at one end, said bar having upper and lower faces lying in parallel planes, each face having a length of at least 72 inches and a width of from about 1½ to 2½ inches, said bar forming an aperture therethrough adjacent each end thereof and extending through said faces;
    connecting means adapted to be coupled to each end of said bar at the apertures for connecting said bar to a hitch on a vehicle and for distributing a force therefrom equally to each end of said bar;
    coupling means for coupling said connecting means to either end of said bar, said coupling means adapted to releasably secure said connecting means at the aperture adjacent the pointed end so that after the bar has been thrust axially through a bale said connecting means may be coupled to both ends thereof and said vehicle may cause said bale to skid along the ground in a horizontal direction without substantial rotation thereof.

2. The device of claim 1 wherein the thickness of said bar is about ⅜ inches.

3. The device of claim 1 wherein said bar is constructed of spring steel having a Brinell hardness test rating of 290 to 310.

4. The device of claim 1 wherein said connecting means includes a V-shaped member with adjacent ends thereof adapted to be coupled to opposite ends of said bar and the apex adapted to receive a force from the vehicle.

5. The device of claim 4 wherein said coupling means is a pair of clevises adapted to couple ends of said V-shaped member to opposite ends of said bar.

6. The device of claim 4 wherein said coupling means includes at least one S-link adapted to couple an end of said V-shaped member to an end of said bar.

7. The device of claim 4 wherein said V-shaped member is a chain.

8. The device of claim 4 wherein said coupling means is a pair of shackles adapted to couple ends of said V-shaped member to opposite ends of said bar.

9. The device of claim 1 wherein said bar is about 1¾ inches wide.

* * * * *